United States Patent
Fang et al.

(10) Patent No.: US 10,541,743 B2
(45) Date of Patent: Jan. 21, 2020

(54) COMMUNICATION SYSTEM AND OPERATING METHOD THEREOF

(71) Applicant: INDUSTRIAL TECHNOLOGY RESEARCH INSTITUTE, Hsinchu (TW)

(72) Inventors: Shih-Hao Fang, Zhubei (TW); Jen-Yuan Hsu, Jincheng Township, Kinmen County (TW); Hung-Fu Wei, Hsinchu (TW); Chien-Yu Kao, Sanchong (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 0 days.

(21) Appl. No.: 15/857,082

(22) Filed: Dec. 28, 2017

(65) Prior Publication Data
US 2019/0190584 A1 Jun. 20, 2019

(30) Foreign Application Priority Data
Dec. 14, 2017 (TW) .............................. 106143901 A

(51) Int. Cl.
*H04B 7/08* (2006.01)
*H04B 17/318* (2015.01)

(52) U.S. Cl.
CPC ......... *H04B 7/0834* (2013.01); *H04B 17/318* (2015.01)

(58) Field of Classification Search
CPC .... H04W 16/28; H04B 7/0834; H04B 17/318
(Continued)

(56) References Cited

U.S. PATENT DOCUMENTS

| 6,055,230 A | 4/2000 | Feuerstein et al. |
| 7,072,692 B1 * | 7/2006 | Katz .................. H04B 7/0608 455/442 |

(Continued)

FOREIGN PATENT DOCUMENTS

| CN | 1337838 A | 2/2002 |
| CN | 200973090 Y | 11/2007 |

(Continued)

OTHER PUBLICATIONS

Bhobe et al., "An overview of smart antenna technology for wireless communication," *2001 IEEE Aerospace Conference Proceedings*, 2001, vol. 2, pp. 2-875-2-883.

(Continued)

*Primary Examiner* — Kevin M Burd
(74) *Attorney, Agent, or Firm* — Muncy, Geissler, Olds & Lowe, P.C.

(57) ABSTRACT

A communication system and an operating method thereof are provided. The communication system includes at least one user equipment, at least one remote radio head (RRH), a measuring unit, a set determining unit and an antenna selecting unit. The RRH is electrically connected to a plurality of antennas. The measuring unit is for controlling a measurement of a signal strength of the at least one user equipment. The set determining unit is used for selecting one of a plurality of antenna configuration sets according to the signal strength for the at least one user equipment. Each of the antenna configuration sets includes a plurality of antenna configurations. Each of the antenna configurations is composed of P of a plurality of antennas. The antenna selecting unit is used for allocating one of the antenna configurations from the antenna configuration set which is selected for the at least one user equipment.

25 Claims, 9 Drawing Sheets

(58) Field of Classification Search
USPC .......................................................... 375/267
See application file for complete search history.

(56) References Cited

U.S. PATENT DOCUMENTS

| | | | |
|---|---|---|---|
| 7,877,113 B2 | 1/2011 | Kish et al. | |
| 9,337,973 B2 | 5/2016 | Hou et al. | |
| 9,537,559 B1 | 1/2017 | Liu | |
| 9,578,534 B2 | 2/2017 | Yu et al. | |
| 2005/0176468 A1 | 8/2005 | Iacono et al. | |
| 2009/0022066 A1 | 1/2009 | Kish et al. | |
| 2009/0067539 A1 | 3/2009 | Maltsev et al. | |
| 2010/0265924 A1 | 10/2010 | Yong et al. | |
| 2011/0086663 A1 | 4/2011 | Gorokhov et al. | |
| 2011/0230224 A1 | 9/2011 | Larsson | |
| 2012/0087310 A1 | 4/2012 | Hui et al. | |
| 2012/0099682 A1 | 4/2012 | Kuwahara et al. | |
| 2012/0314665 A1 | 12/2012 | Ishida et al. | |
| 2013/0114425 A1 | 5/2013 | Sayana et al. | |
| 2013/0128761 A1 | 5/2013 | Kang et al. | |
| 2013/0230008 A1* | 9/2013 | Christoffersson | H04B 7/0465 370/329 |
| 2013/0336224 A1 | 12/2013 | Davydov et al. | |
| 2014/0009338 A1* | 1/2014 | Lin | H01Q 3/247 342/374 |
| 2014/0098690 A1 | 4/2014 | Siomina et al. | |
| 2014/0269964 A1 | 9/2014 | Du et al. | |
| 2015/0092704 A1 | 4/2015 | Chen | |
| 2015/0223231 A1 | 8/2015 | Noh | |
| 2015/0365157 A1 | 12/2015 | Yang et al. | |
| 2016/0165469 A1 | 6/2016 | Gopalakrishnan et al. | |
| 2016/0267781 A1* | 9/2016 | Papay | G08C 17/02 |
| 2016/0337881 A1 | 11/2016 | Zhang et al. | |
| 2017/0064675 A1 | 3/2017 | Kim et al. | |
| 2018/0183496 A1 | 6/2018 | Gasner et al. | |

FOREIGN PATENT DOCUMENTS

| | | |
|---|---|---|
| CN | 104584453 A | 4/2015 |
| CN | 105474556 A | 4/2016 |
| TW | M297539 | 9/2006 |
| TW | 200729774 | 8/2007 |
| TW | 200845625 A | 11/2008 |
| TW | I323576 B | 4/2010 |
| TW | I335156 | 12/2010 |
| TW | I442726 B | 6/2014 |
| TW | 201429182 A | 7/2014 |
| TW | I531193 B | 4/2016 |
| TW | I587645 | 6/2017 |
| TW | I617148 B | 3/2018 |
| WO | WO2017/172779 A1 | 10/2017 |

OTHER PUBLICATIONS

Nicolaescu et al., "Smart antennas for wireless communications systems," *2010 Conference Proceedings ICECom, 20th International Conference on Applied Electromagnetics and Communications*, Dubrovnik, 2010, pp. 1-4.

Zhu et al., "Transmission mode selection for energy saving in the CoMP system with semi-smart antenna," 2012 International Symposium on Communications and Information Technologies (ISCIT), Gold Coast, QLD, 2012, pp. 855-860.

S. Das, "Smart antenna design for wireless communication using adaptive beam-forming approach," TENCON 2008—2008 IEEE Region 10 Conference, Hyderabad, 2008, pp. 1-5.

Inoue et al., "New smart antenna algorithm applied to autonomous area control for mobile radio network," 2009 3rd European Conference on Antennas and Propagation, Berlin, 2009, pp. 2050-2054.

Rezk et al, "Performance comparison of a novel hybrid smart antenna system versus the fully adaptive and switched beam antenna arrays," 2005 International Conference on Wireless Networks, Communications and Mobile Computing, 2005, vol. 2, pp. 874-878.

Gao et al., "Stacked Patch Antenna with Dual-Polarization and Low Mutual Coupling for Massive MIMO," in IEEE Transactions on Antennas and Propagation, vol. 64, No. 10, Oct. 2016, pp. 4544-4549.

"Wi-Fi Calling Goes Mainstream, Using Smart Wi-Fi to Deliver a Carrier-Class Voice Offering," https://ruckus-www.s3.amazonaws.com/pdf/wp/wp-wifi-calling.pdf Ruckus, Simply Better Wireless, White Paper, Dec. 2014, 4 pages.

Viteri-Mera et al., "Beam Selection in Multiuser Millimeter-Wave Systems with Sub-Array User Terminal Architectures," 2017 SBMO/IEEE MTT-S Int'l Microwave and Optoelectronics Conference, Aug. 27-30, 2017.

Chen, Yejian, "Data Transmission in Wideband Code Division Multiple Access (WCDMA/FDD) Systems with Multiple Transmit Antennas," http://www.inue.unistuttqart. 127 pages.

Office Action, U.S. Appl. No. 15/857,112 dated Mar. 8, 2019 is attached, 30 pages.

Office Action dated Oct. 21, 2019 in U.S. Appl. No. 15/857,112.

* cited by examiner

COMMUNICATION SYSTEM AND OPERATING METHOD THEREOF

This application claims the benefit of Taiwan application Serial No. 106143901, filed Dec. 14, 2017, the disclosure of which is incorporated by reference herein in its entirety.

TECHNICAL FIELD

The disclosure relates in general to a communication system and an operating method thereof.

BACKGROUND

The smart antenna technology has been applied on the WiFi system. In the smart antenna technology, the radiation directions of the antennas are different, and the base station selects the best beam formed by one of the antennas for the user equipment to improve the transmission efficiency. However, in traditional, the smart antenna technology applied on the WiFi system is performed by the packet-based transmission. By using the packet-based transmission, only one user equipment is served until one packet is transmitted completely, so it cannot be applied for the 5G New Radio (NR).

Further, only one of the antennas in the smart antenna is selected to form the antenna pattern for the user equipment. It is not suitable for some situations, so the transmission efficiency cannot be improved.

SUMMARY

The disclosure is directed to a communication system and an operating method thereof.

According to one embodiment, an operating method of a communication system is provided. The communication system is used for at least one user equipment to communicate. The operating method includes the following steps. A plurality of antenna configuration sets are obtained. Each of the antenna configuration sets includes a plurality of antenna configurations. Each of the antenna configurations is composed of P of a plurality of antennas. P is larger than or equal to 1. P is different in the antenna configuration sets. A measurement of a plurality of performance values of the antenna configurations in each of the antenna configuration sets is controlled for the at least one user equipment, such that for the at least one user equipment, one of the antenna configurations is allocated. The communication system includes at least one remote radio head (RRH) electrically connected to the antennas.

According to another embodiment, an operating method of a communication system is provided. The communication system is used for at least one user equipment to communicate. The operating method includes the following steps. A measurement of a signal strength of the at least one user equipment is controlled. One of a plurality of antenna configuration sets is selected according to the signal strength for the at least one user equipment. Each of the antenna configuration sets includes a plurality of antenna configurations. Each of the antenna configurations is composed of P of a plurality of antennas. P is larger than or equal to 1. P is different in the antenna configuration sets. One of the antenna configurations in the antenna configuration set which is selected is allocated for the at least one user equipment. The communication system includes at least one remote radio head (RRH) electrically connected to the antennas.

According to an alternative embodiment, a communication system is provided. The communication system includes at least one user equipment, at least one remote radio head (RRH), a measuring unit, a set determining unit and an antenna selecting unit. The RRH is electrically connected to a plurality of antennas. The measuring unit is used for controlling a measurement of a signal strength of the at least one user equipment. The set determining unit is used for selecting one of a plurality of antenna configuration sets according to the signal strength for the at least one user equipment. Each of the antenna configuration sets includes a plurality of antenna configurations. Each of the antenna configurations is composed of P of a plurality of antennas. P is larger than or equal to 1. P is different in the antenna configuration sets. The antenna selecting unit is used for allocating one of the antenna configurations from the antenna configuration set which is selected for the at least one user equipment.

Figure 1:
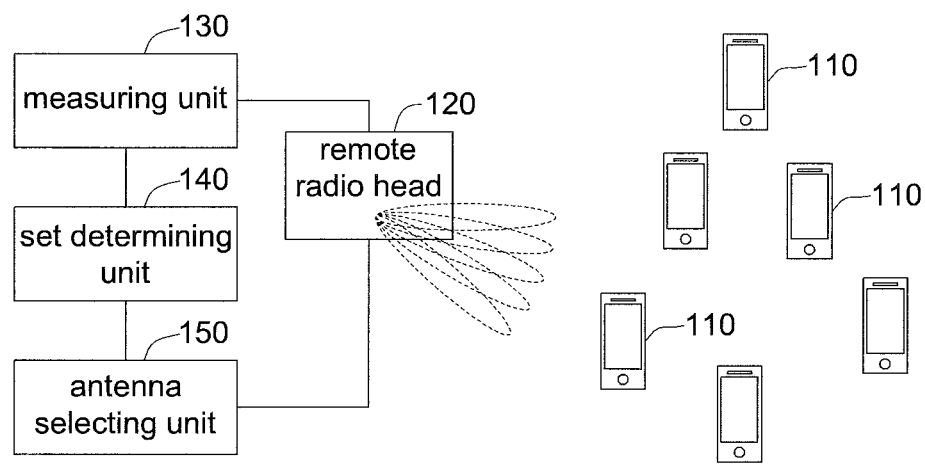
FIG. 1 shows a communication system according to one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please refer to FIG. 1, which shows a communication system 100 according to one embodiment. The communication system 100 includes at least one user equipment 110, at least one remote radio head (RRH) 120, a measuring unit 130, a set determining unit 140 and an antenna selecting unit 150. For example, the user equipment 110 may be, but not limited to, a smart phone, a laptop, a vehicle computer, a smart TV, a robot or a smart appliance. The RRH 120 is electrically connected to a plurality of antennas. The RRH 120 is adopted the smart antenna technology, and may select one of several antenna configurations, each of which is composed of one or more antennas, to form a particular beam for the user equipment 110. The antenna configurations can be grouped into a plurality of antenna configuration sets. The measuring unit 130 is used for controlling the measurement of the signal. The set determining unit 140 is used for selecting one of the antenna configuration sets. The antenna selecting unit 150 is used for allocating the antenna configurations. Each of the measuring unit 130, the set determining unit 140 and the antenna selecting unit 150 may be, but not limited to, a chip, a circuit, a circuit board, or a non-transitory computer-readable media. In one embodiment, the RRH 120, the measuring unit 130, the set determining unit 140 and the antenna selecting unit 150 can be disposed in the one device to form a base station. In another embodiment, the measuring unit 130, the set determining unit 140 and the antenna selecting unit 150 can be disposed in the one device to form a controller. In another embodiment, the RRH 120, the measuring unit 130, the set determining unit 140 and the antenna selecting unit 150 can be disposed in different devices. The configuration of the RRH 120, the measuring unit 130, the set determining unit 140 and the antenna selecting unit 150 is not used to limit the present disclosure.

Figure 2:
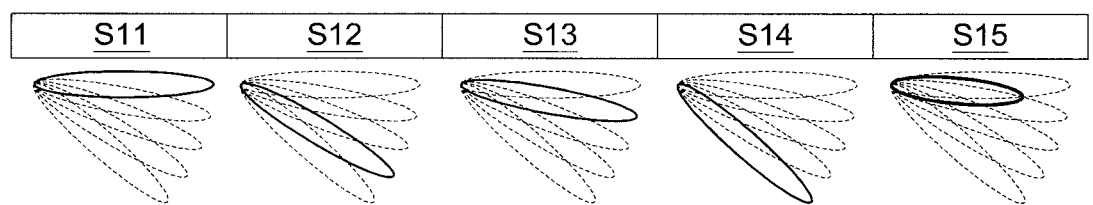
FIG. 2 illustrates a slot-based transmission.

Please refer to FIG. 2, which illustrates a slot-based transmission. In the present embodiment, the communication system 100 adopts the slot-based transmission, instead of the packet-based transmission, for the 5G New Radio (NR). The communication system 100 is not limited to be adopted for the 5G NR. For example, from the time slot S11 to the time slot S15, the communication system 100 selects different antenna configurations for transmission. The solid line represents the beam formed by the selected antenna in the antenna configuration, and the dotted lines represent the unformed beams. In the time slots S11 to S14, each of the beams is formed by one antenna. The angels of the beams in the time slots S11 to S14 are different. In the time slot S15, the beam is formed by two antennas. The communication system 100 can flexibly select a suitable antenna configuration.

Figure 3:
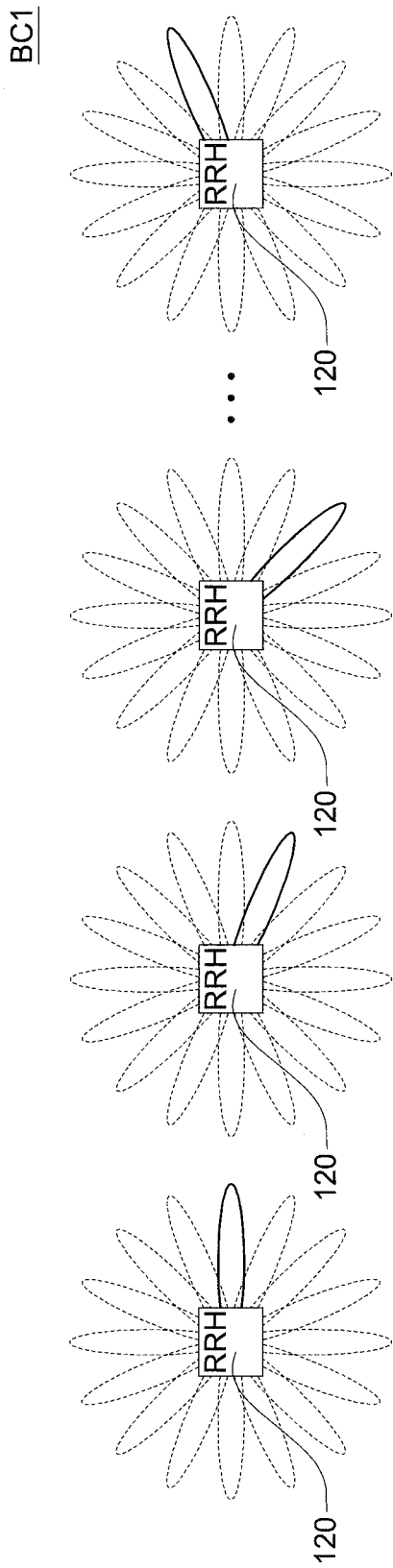
FIG. 3 shows a plurality of beams, each of which is formed by one antenna.

Please refer to FIG. 3, which shows a plurality of beams, each of which is formed by one antenna. The number of the antenna electrically connected to the RRH 120 can be arbitrarily determined. The antennas pointing toward different directions, so the formed beams pointing toward different directions. Therefore, the communication system 100 can select the beam pointing toward the user equipment 110 according to the location of the user equipment 110. For example, when the user equipment 110 moves during a new time slot, the selected antenna can be changed to form a suitable beam pointing toward the user equipment 110.

Figure 4:
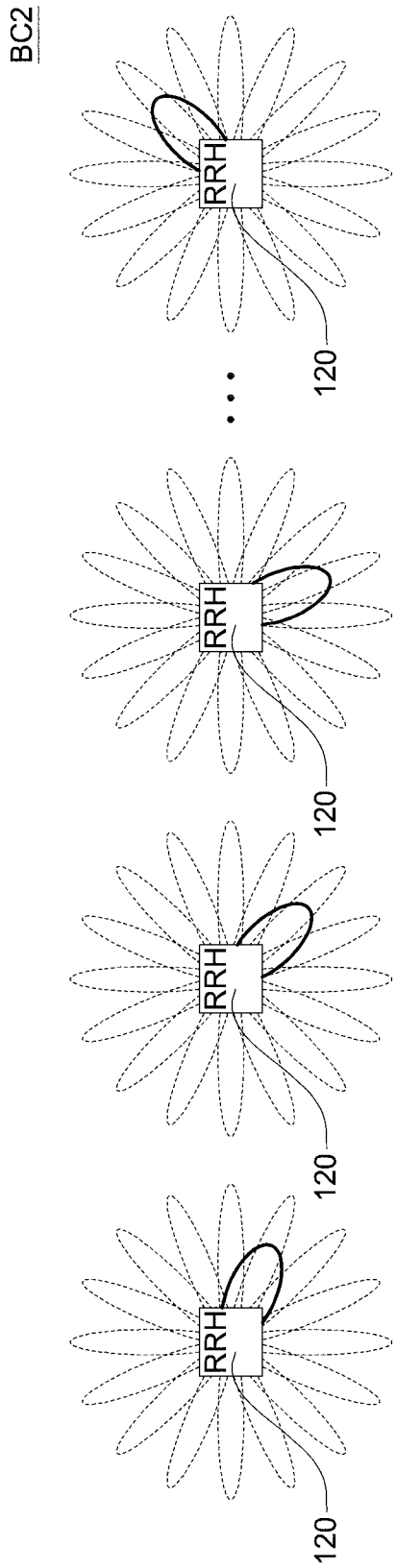
FIG. 4 shows a plurality of beams, each of which is formed by three antennas.

Please refer to FIG. 4, which shows a plurality of beams, each of which is formed by three antennas. In some embodiment, more than one of the antennas electrically connected to the RRH 120 can be selected. When three adjacent antennas are selected, the beam form by the antenna configuration can cover a wide range. For example, when the moving range of the user equipment 110 is large, the beam formed by more antennas can be selected to cover this user equipment 110. Different beams, each of which is formed by several antennas, may be partially overlapped. As shown in FIG. 4, the first beam and the second beam are partially overlapped, and the second beam and the third beam are overlapped.

Each of the antenna configurations can be formed by P of the antennas. P is larger than or equal to 1. In FIG. 3, P is 1. In FIG. 4, P is 3. In the antenna configurations with different P, the RRH 120 provides an identical power to all of the P of the antennas. Therefore, if P is small, the beam formed by this antenna configuration has long projecting distance and narrow coverage; if P is large, the beam formed by this antenna configuration has short projecting distance and wide coverage. The communication system 100 can select a suitable antenna configuration based on the application. The operation of the communication system 100 is illustrated as below.

Figure 5:
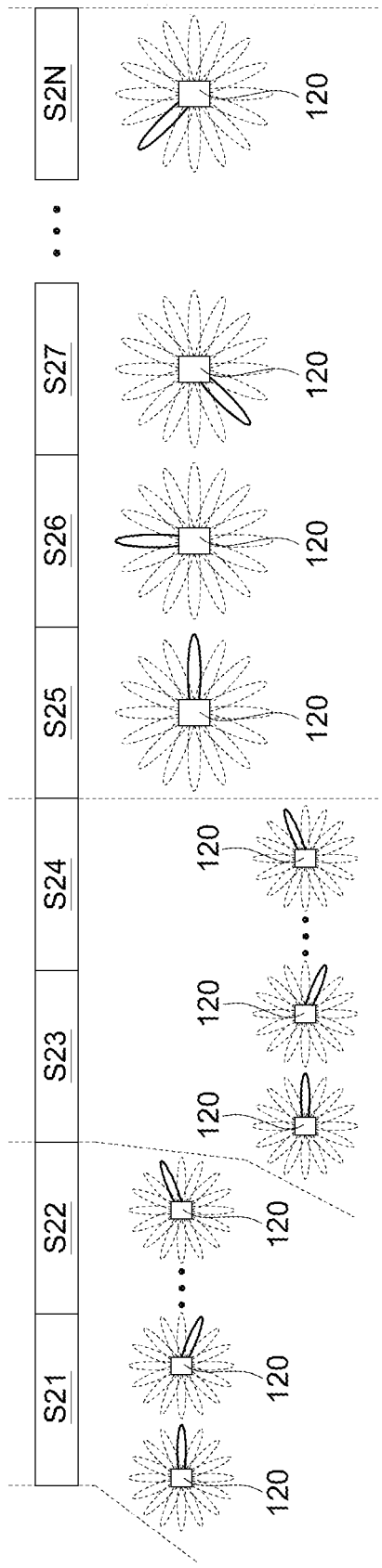
FIG. 5 illustrates the operation of the communication system according to one embodiment.

Please refer to FIG. 5, which illustrates the operation of the communication system 100 according to one embodiment. Before the data transmitting stage, a measuring stage of the communication system 100 is performed. As shown in the time slots S21, S22, the measuring unit of the communication system 100 performs a downlink probing procedure. In this procedure, the measuring unit 130 executes the antenna sweeping to form different beams sequentially and controls the measurement of those beams. Similarly, as shown in time slots S23, S24, the measuring unit 130 of the communication system 100 performs an uplink probing procedure. In this procedure, the measuring unit 130 executes the antenna sweeping to form different beams sequentially and controls the measurement of the beams. The sequence of the downlink probing procedure and the uplink probing procedure can be changed and is not limited to the disclosure.

The measuring unit 130 may measure the performance via the Channel Quality Indicator (CQI), the Signal-to-Noise Ratio (SNR), the Signal-to-Interference-plus-Noise Ratio (SINR), the Received Signal Strength Indicator (RSSI), the Reference Signal Received Quality (RSRQ), the Reference Signal Received Power (RSRP), or the Throughput. After performing the downlink probing procedure and the uplink probing procedure of the measuring stage, the data transmitting stage is performed. As shown in time slots S25, S26, S27 to S2N, at different time, the communication system 100 can select the optimum antenna configuration according to the current situation.

Figure 6:
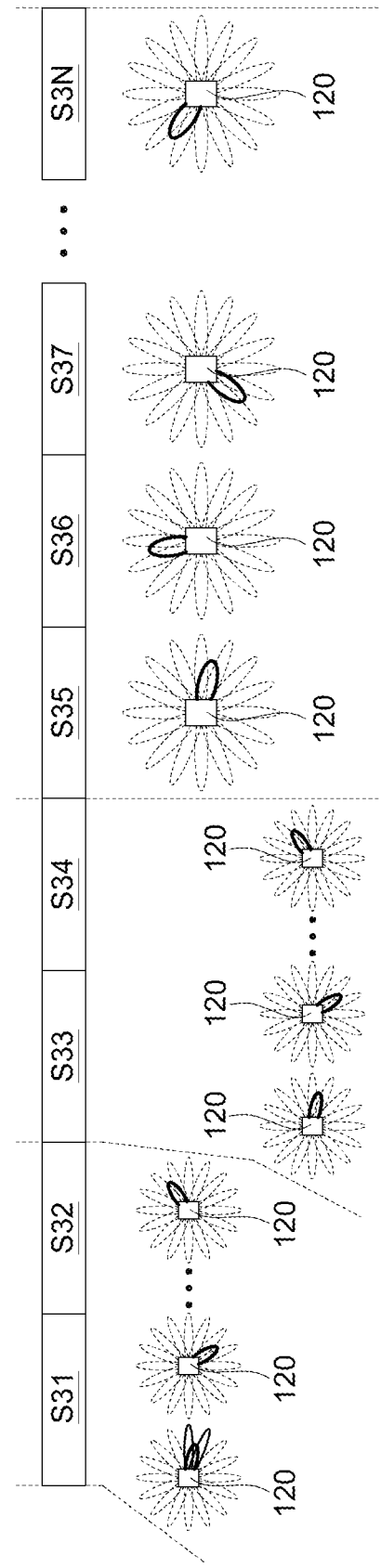
FIG. 6 illustrates the operation of the communication system according to another embodiment.

Please refer to FIG. 6, which illustrates the operation of the communication system 100 according to another embodiment. A beam can be formed by P of the antennas. P is not limited to 1. In the downlink probing procedure during the time slots S31, S32, the beam formed by two antennas can be used. In the uplink probing procedure during the time slots S33, S34, the beam formed by two antennas can be used. During the time slots S35, S36, S37 to S3N, the beam formed by two antennas can be used.

During the downlink probing procedure and the uplink probing procedure in the measuring stage, P can be changed for the measurement of different antenna configurations. In the data transmitting stage, P is not limited to 1 and the communication system 100 can select the suitable antenna configuration according to the current situation. The operating method of the communication system 100 is illustrated as below.

Figure 7:
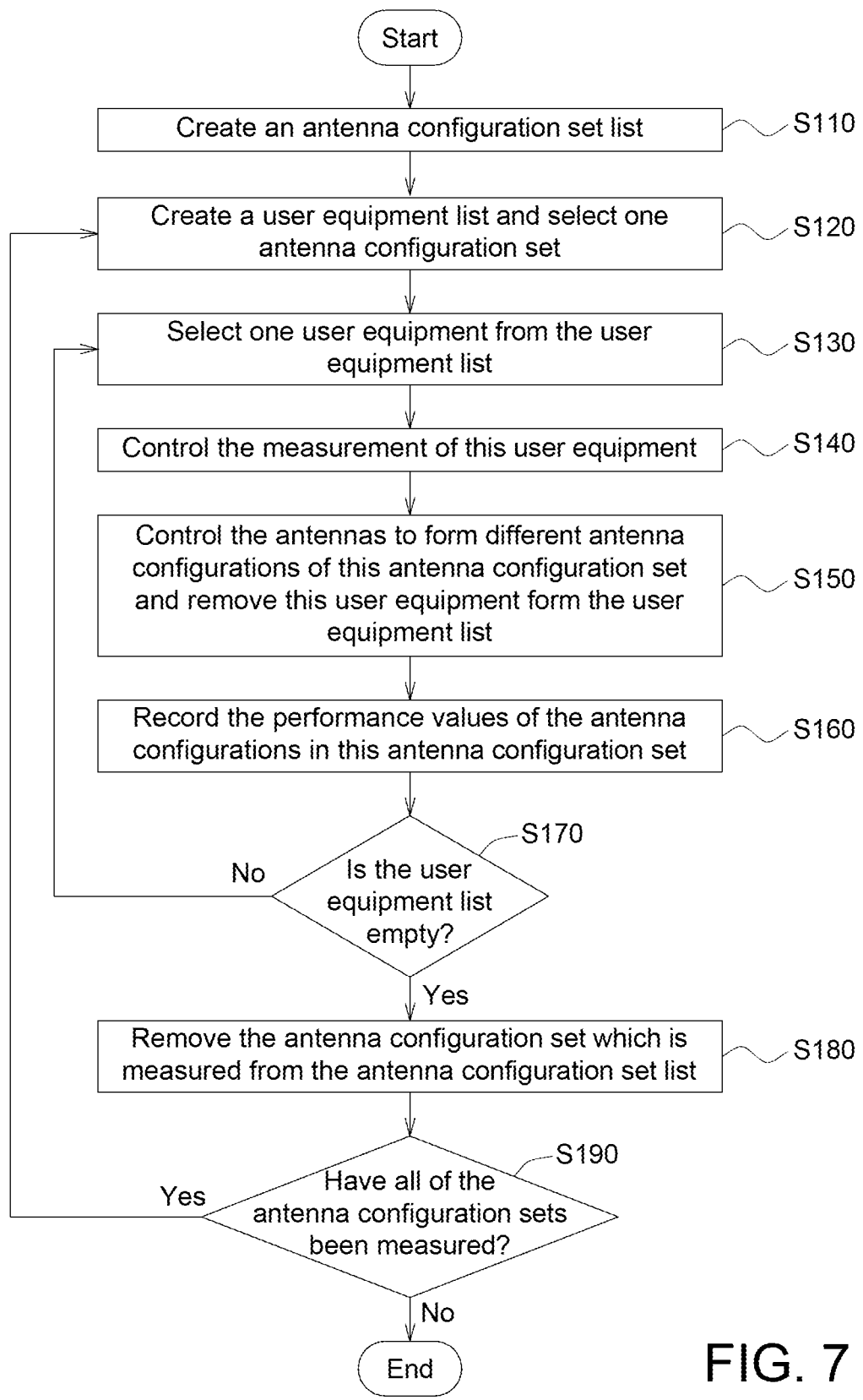
FIG. 7 shows a flowchart of the operating method of the communication system according to one embodiment.

Please refer to FIG. 7, which shows a flowchart of the operating method of the communication system according to one embodiment. In step S110, the set determining unit 140 of the communication system 100 creates an antenna configuration set list (or called antenna configuration set pool). For example, the antenna configuration set list may include the antenna configuration set BC1 in FIG. 3 and the antenna configuration set BC3 in FIG. 4. Each of the antenna configuration set includes a plurality of antenna configurations. Each of the antenna configurations is composed of P of the antennas. P is larger than or equal to 1. The P is different in the antenna configuration sets. For example, antenna configurations of the antenna configuration set BC1 in FIG. 3 is composed of one antenna, and P in this antenna configuration set BC1 is 1; the antenna configurations of the antenna configuration set BC3 in FIG. 4 is composed of three antennas and P in this antennas configuration set BC3 is 3.

In step S120, the measuring unit 130 of the communication system 100 creates a user equipment list (or called user equipment pool), to collect the user equipments 110 needed to be served. And, the measuring unit 130 notifies the set determining unit 140 to select one antenna configuration set form the antenna configuration set list.

In step S130, the measuring unit 130 of the communication system 100 selects one user equipment 110 from the user equipment list.

Next, in the step S140, the measuring unit 130 of the communication system 100 controls the measurement of this user equipment 110.

In step S150, the antenna selecting unit 150 controls the antennas to form different antenna configurations of this antenna configuration set. The measuring unit 130 controls the measurement of performance, or the user equipment 110 performs the measurement and transmits the result to the measuring unit 130. Afterwards, the measuring unit 130 removes this user equipment 110 form the user equipment list.

In step S160, the measuring unit 130 records the performance values of the antenna configurations in this antenna configuration set.

In step S170, the measuring unit 130 determines whether the user equipment list is empty. If the user equipment list is not empty, then the process returns to the steps S130 to S160, until all of the user equipments 110 in the user equipment list have been measured. For example, please refer to table I, which shows the performance values of the antenna configurations in the antenna configuration set whose P is 1. A to E represent different user equipments 110.

TABLE I

| antenna configuration | user equipment | | | | | |
|---|---|---|---|---|---|---|
| | A | B | C | D | E | ... |
| (10000) | 15 | 10 | 8 | 5 | 15 | ... |
| (01000) | 13 | 13 | 12 | 6 | 13 | ... |
| (00100) | 3 | 12 | 15 | 12 | 4 | ... |
| (00010) | 2 | 7 | 12 | 13 | 2 | ... |
| (00001) | 13 | 10 | 7 | 6 | 13 | ... |

In step S180, the measuring unit 130 notifies the set determining unit 140 to remove the antenna configuration set which is measured from the antenna configuration set list.

In step S190, the measuring unit 130 notifies the set determining unit 140 to determine whether all of the antenna configuration sets have been measured. If not all of the antenna configuration sets have been measured, the process returns to steps S120 to S180, until all of the antenna configuration sets have been measured. For example, table II shows the performance values of the antenna configuration set whose P is 2.

TABLE II

| antenna configuration | user equipment | | | | | |
|---|---|---|---|---|---|---|
| | A | B | C | D | E | ... |
| (11000) | 5 | 11 | 8 | 15 | 5 | ... |
| (01100) | 3 | 3 | 2 | 16 | 3 | ... |
| (00110) | 13 | 2 | 5 | 12 | 14 | ... |
| (00011) | 12 | 15 | 2 | 3 | 12 | ... |

Similarly, the performance values of the antenna configuration set whose P is 3, 4 or 5 can be recorded in another table. That is to say, through the steps described above, the communication system 100 controls and records the measurement of the performance values of the antenna configurations in each of the antenna configuration sets for each of the user equipments 110.

In the measuring stage, it is no need to measure all of the antenna configurations. The communication system 100 may perform the measurement during the idle time and update the table. Even if not all of the performance values of the antenna configurations are obtained, the communication system 100 still can select the suitable antenna configuration according to the obtained performance values during the data transmission stage.

After the measuring stage, the data transmission stage is performed to select one of the antenna configurations for the user equipment. In one embodiment, the antenna configuration having the best performance value can be selected for the user equipment.

Figure 8:
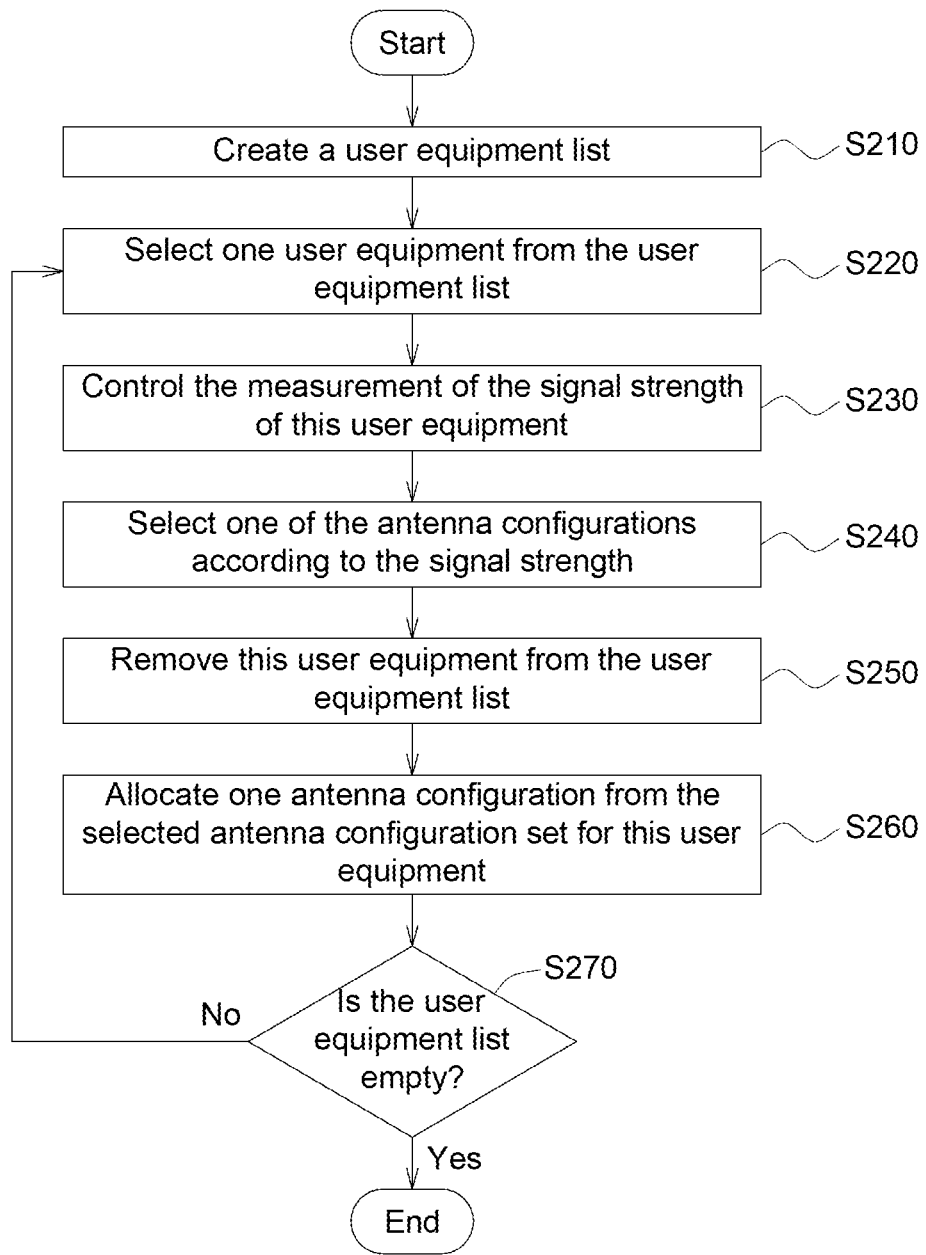
FIG. 8 shows a flowchart of the operating method of the communication system according to another embodiment.

Please refer to FIG. 8, which shows a flowchart of the operating method of the communication system 100 according to another embodiment. In step S210 of this embodiment, the measuring unit 130 creates the user equipment list, to collect the user equipments 110 needed to be served.

Next, in step S220, the measuring unit 130 selects one user equipment 110 from the user equipment list.

In step S230, the measuring unit 130 controls the measurement of the signal strength of this user equipment 110. General speaking, the signal strength is negatively related to the distance between this user equipment 110 and the RRH 120. The stronger the signal strength is, the closer the distance between this user equipment 110 and the RRH 120 is.

In step S240, the set determining unit 140 selects one of the antenna configurations according to the signal strength. For example, if the signal strength is weak, i.e. the distance between this user equipment 110 and the RRH 120 is far, the set determining unit 140 select one antenna configuration set whose P is small, such that the beam formed by the antenna configuration can be projected to this user equipment 110. If the signal strength is strong, i.e. the distance between this user equipment 110 and the RRH 120 is close, the set determining unit 140 selects one antenna configuration set whose P is large, such that the user equipment 110 can be moved within the coverage of the beam.

In step S250, the measuring unit 130 removes this user equipment 110 from the user equipment list.

In step S260, the antenna selecting unit 150 allocates one antenna configuration from the selected antenna configuration set for this user equipment 110. In this step, the antenna configuration whose performance value is the best can be allocated by the antenna selecting unit 150.

In step S270, the measuring unit 130 determines whether the user equipment list is empty or not. If the user equipment list is not empty, then the process returns to steps S220 to S260, until all of the user equipment 110 have been allocated one antenna configuration set and one antenna configuration thereof.

Figure 9:
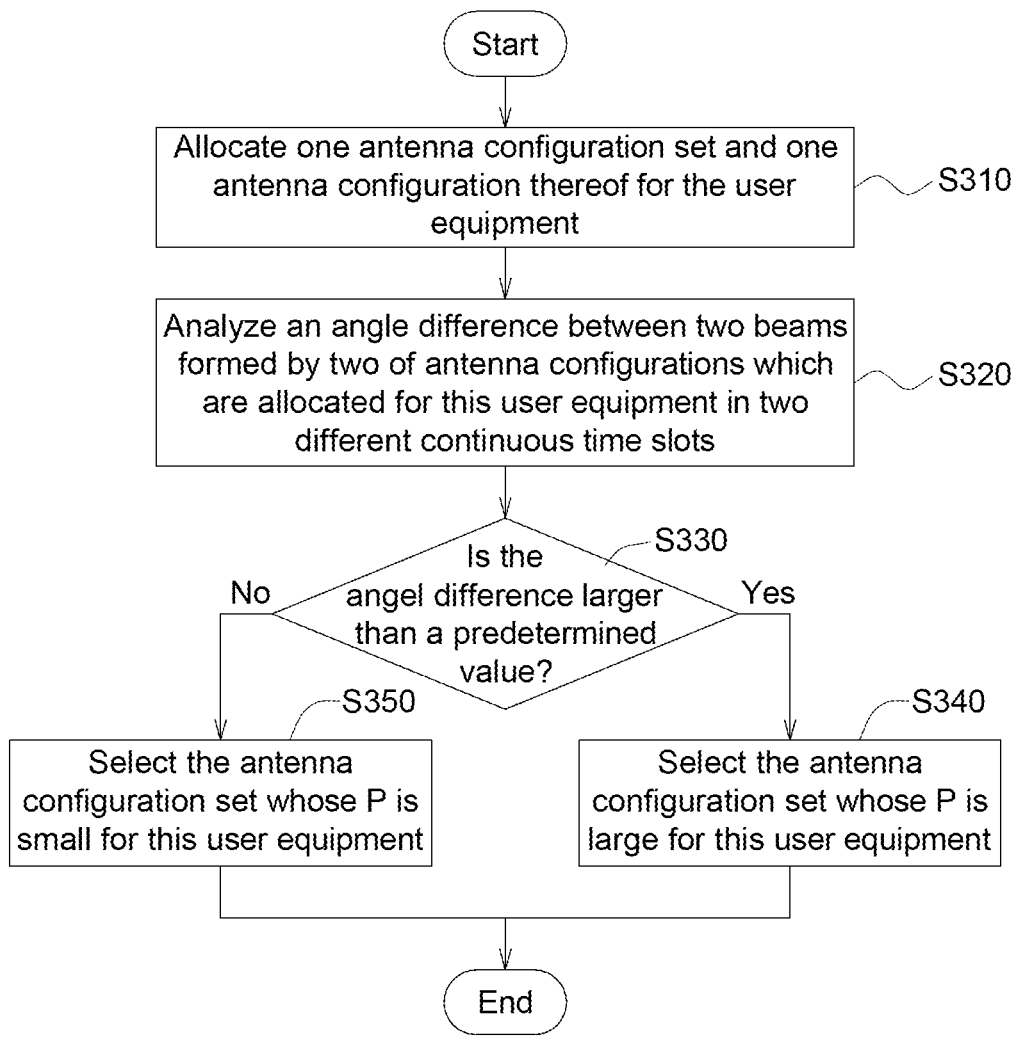
FIG. 9 shows a flowchart of the operating method of the communication system according to another embodiment.

Through the steps described above, the suitable antenna configuration can be allocated for the user equipment 110. In the present embodiment, the slot-based transmission is adopted, so when the time slot is changed, another suitable antenna configuration set and another suitable antenna configuration thereof can be allocated. In one embodiment, the operation method of the communication system 100 may change the selected antenna configuration set according to the moving status of the user equipment 110. Please refer to FIG. 9, which shows a flowchart of the operating method of the communication system 100 according to another embodiment. In step S310, one antenna configuration set and one antenna configuration thereof are allocated for the user equipment 110. This step is illustrated as the flowchart of FIG. 8.

In step S320, the set determining unit 140 analyzes an angle difference between two beams formed by two of antenna configurations which are allocated for this user equipment 110 in two different continuous time slots.

Then, in step S330, the set determining unit 140 determines whether the angel difference is larger than a predetermined value. If the angle difference is larger than the predetermined value, then the process proceeds to step S340; if the angel difference is not larger than the predetermined value, then the process proceeds to step S350.

In step S340, the angel difference is large, so it means that the moving range of this user equipment 110 is large. In this step, the set determining unit 140 selects the antenna configuration set whose P is large for this user equipment 110.

In step S350, the angel difference is not larger than the predetermined value, so it means that the moving range of this user equipment 110 is not large and this user equipment 110 may be far away from the RRH 120. In this step, the set determining unit 140 selects the antenna configuration set whose P is small for this user equipment 110.

Figure 10:
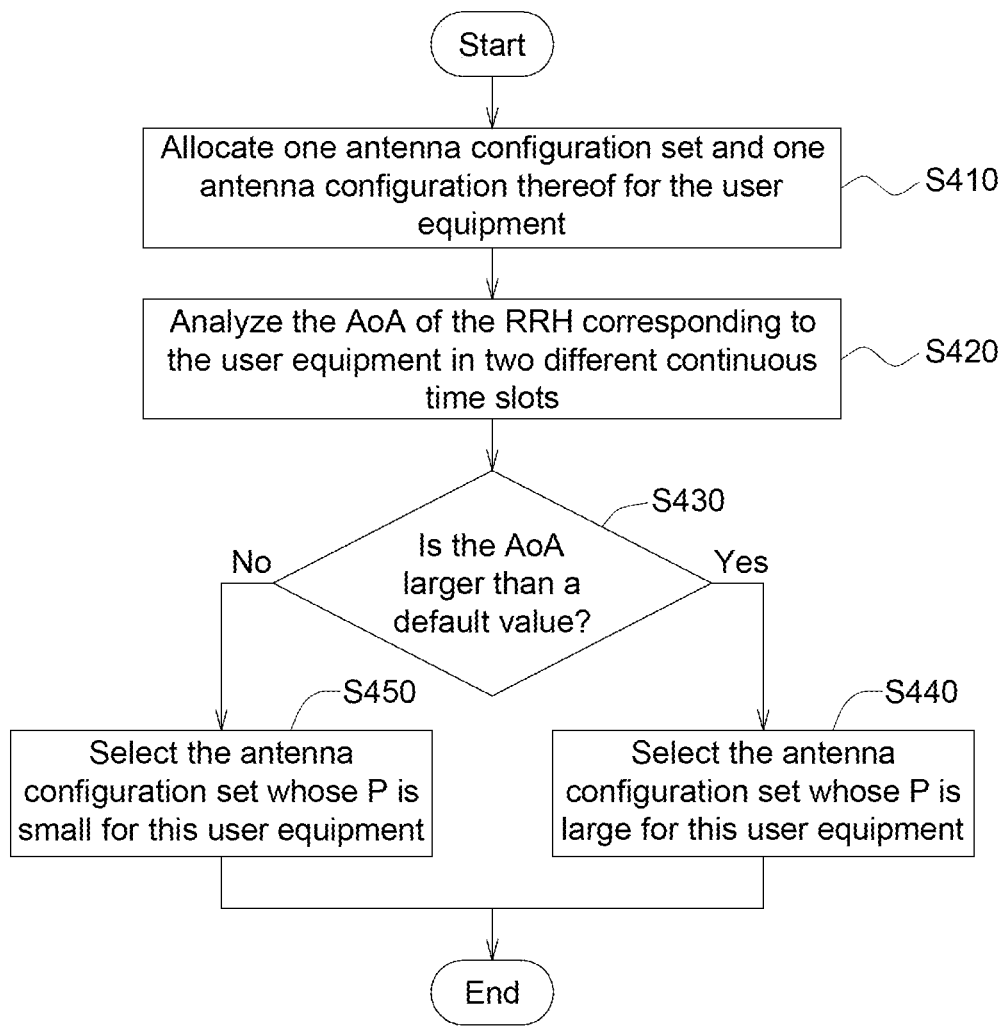
FIG. 10 shows a flowchart of the operating method of the communication system according to another embodiment.

In addition to the angle difference between two beams, the moving status may be an angle of arrival (AoA) of the RRH 120 corresponding to the user equipment 110 in two different continuous time slots. The AoA is changed according to the movement of the user equipment 110. Please refer to FIG. 10, which shows a flowchart of the operating method of the communication system 100 according to another embodiment. In step S410, one antenna configuration set and one antenna configuration thereof are allocated for the user equipment 110. This step is illustrated as the flowchart of FIG. 8.

In step S420, the set determining unit 140 analyzes the AoA of the RRH 120 corresponding to the user equipment 110 in two different continuous time slots.

In step S430, the set determining unit 140 determines whether the AoA is larger than a default value. If the AoA is larger than the default value, then the process proceeds to step S440; if the AoA is not larger than the default value, then the process proceeds to step S450.

In step S440, the AoA is larger than the default value, so it means that the moving range of this user equipment 110 is large. In this step, the set determining unit 140 selects the antenna configuration set whose P is large for this user equipment 110.

In step S450, the AoA is not lager than the default value, so it means that the moving range of this user equipment 110 is not large and this user equipment 110 may be far away from the RRH 120. In this step, the set determining unit 140 selects the antenna configuration set whose P is small for this user equipment 110.

As such, under the slot-based transmission, the set determining unit 140 can change the selected antenna configuration set according to the moving status of the user equipment 110 to improve the transmission efficiency.

Figure 11:
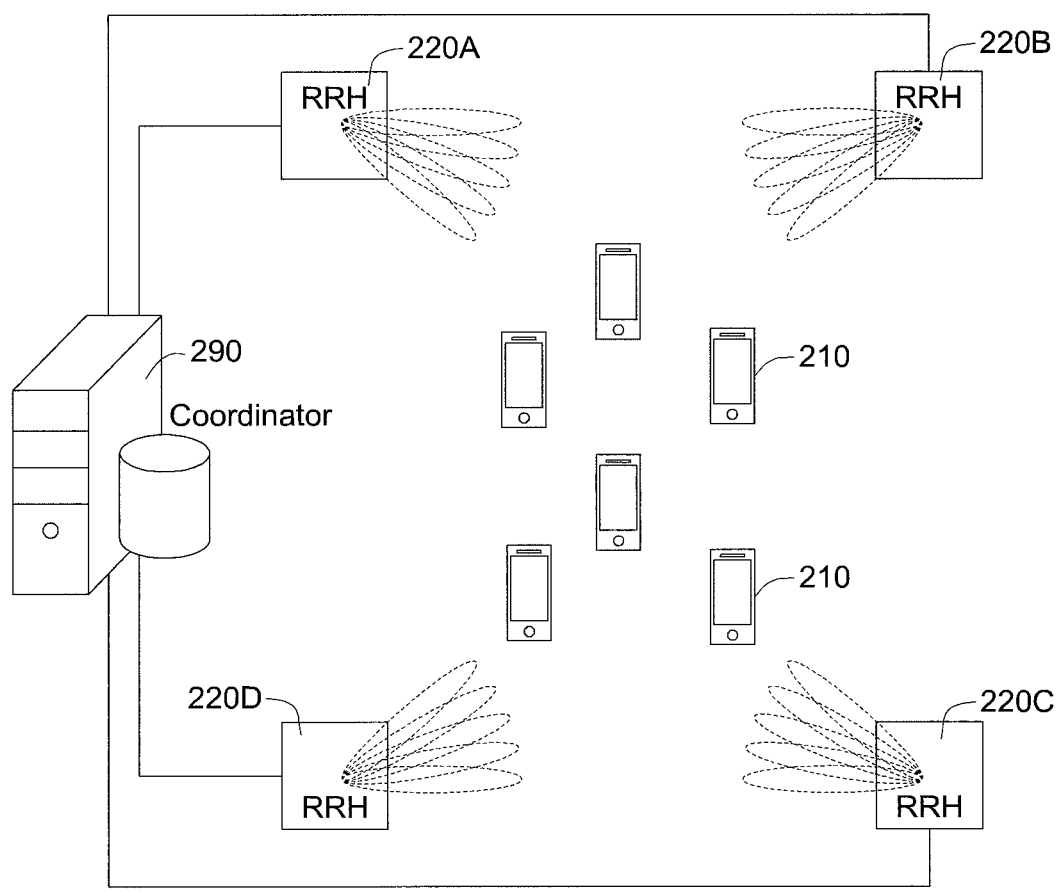
FIG. 11 shows a communication system according to another embodiment.

Based on above, only one RRH 120 is used to illustrate those embodiments. However, more than one RRH may be used in other embodiments. Please refer to FIG. 11, which shows a communication system 200 according to another embodiment. The communication system 200 includes at least one user equipment 210, a plurality of RRHs 220A to 220D and a coordinator 290. Each of the RRHs 220A to 220D is electrically connected to a plurality of antennas.

Each of the RRHs 220A to 220D adopts the smart antenna technology to form beams with different widths and different angles by one or more antennas. Therefore, several antenna configurations can be formed by the RRHs 220A to 220D.

Figure 12:
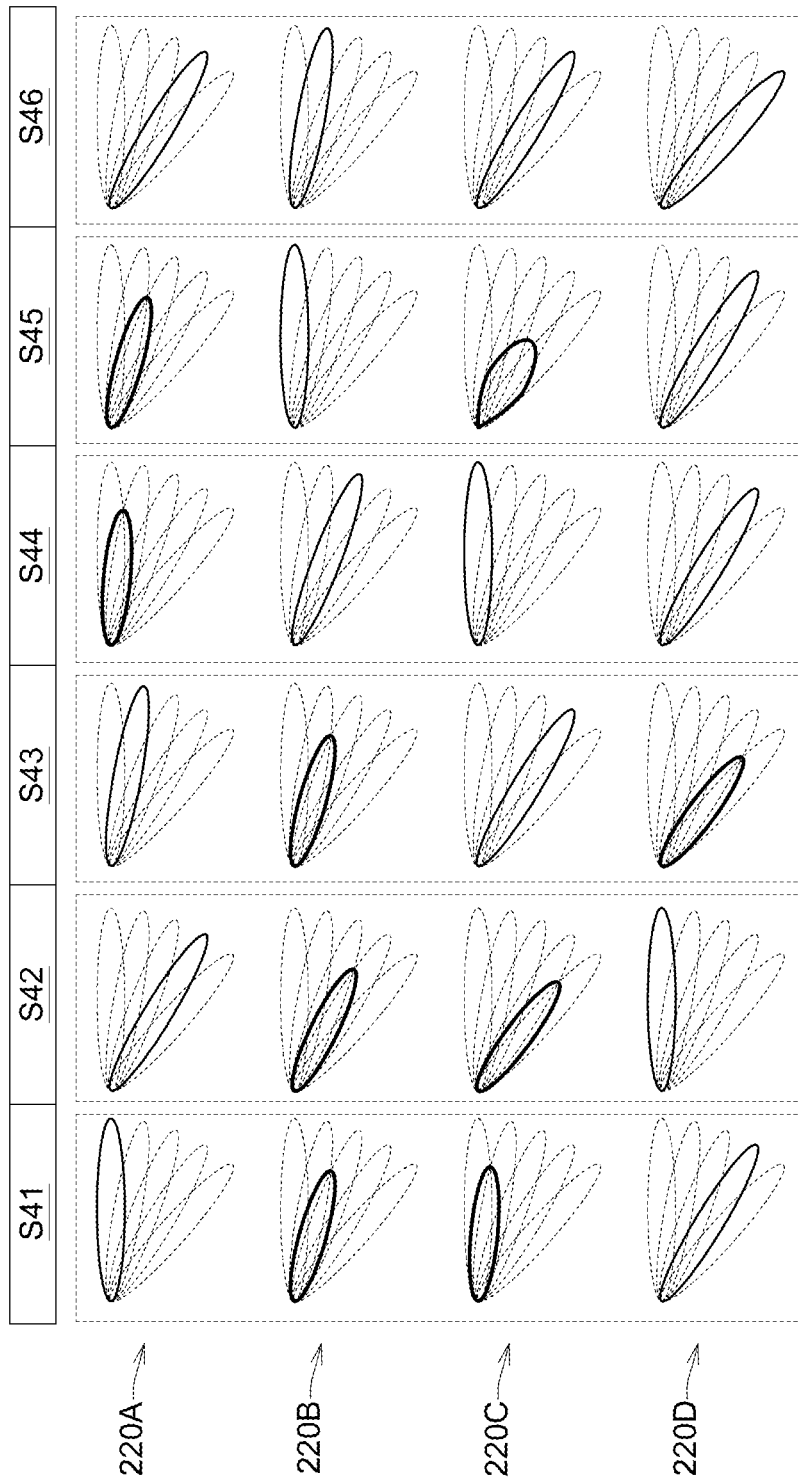
FIG. 12 illustrates the antenna configurations.

Please refer to FIG. 12, which illustrates the antenna configurations. The communication system 200 adopts the slot-based transmission, instead of packet-based, for the 5G New Radio (NR). For example, during the time slot S41 to the time slot S46, the communication system 200 selects different antenna configurations. In the time slot S41, one beam is formed by one antenna connected to the RRH 220A, one beam is formed by two antennas connected to the RRH 220B, one beam is formed by two antennas connected to the RRH 220C, and one beam is formed by one antenna connected to the RRH 2200. In the time slot S45, one beam is formed by two antennas connected to the RRH 200A, one beam is formed by one antenna connected to the RRH 200B, one beam is formed by three antennas connected to the RRH 220C, and one beam is formed by one antenna connected to the RRH 220D. The communication system 200 may select a suitable antenna configuration according to the current situation.

Base on above, the slot-based transmission and the smart antenna technology are adopted in the 5G NR, the beams with different widths and different angles can be formed, and the communication system can allocates the suitable antenna configuration to improve the transmission efficiency.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An operating method of a communication system, wherein the communication system is used for at least one user equipment to communicate, and the operating method comprises:

obtaining a plurality of antenna configuration sets, wherein each of the antenna configuration sets includes a plurality of antenna configurations, each of the antenna configurations is composed of P of a plurality of antennas, P is larger than or equal to 1, P is different in the antenna configuration sets; in the antenna configurations with different P, and the power level provided to all utilized antenna is fixed and always the same no matter the antenna configuration; and controlling a measurement of a plurality of performance values of the antenna configurations in each of the antenna configuration sets for the at least one user equipment, such that for the at least one user equipment, one of the antenna configurations is allocated;

wherein the communication system includes at least one remote radio head (RRH) electrically connected to the antennas.

2. The operating method of the communication system according to claim 1, wherein in each of the antenna configurations, the P of the antennas are adjacent.

3. The operating method of the communication system according to claim 1, wherein a plurality of angles of the antennas are not identical.

4. The operating method of the communication system according to claim 1, wherein in each of the antenna configuration sets, the antenna configurations are partially overlapped.

5. The operating method of the communication system according to claim 1, wherein for the at least one user equipment, one of the antenna configurations having a best performance value of the performance values is allocated.

6. An operating method of a communication system, wherein the communication system is used for at least one user equipment to communicate, and the operating method comprises:
controlling a measurement of a signal strength of the at least one user equipment;
selecting one of a plurality of antenna configuration sets according to the signal strength for the at least one user equipment, wherein each of the antenna configuration sets includes a plurality of antenna configurations, each of the antenna configurations is composed of P of a plurality of antennas, P is larger than or equal to 1, P is different in the antenna configuration sets; in the antenna configurations with different P, and the power level provided to all utilized antenna is fixed and always the same no matter the antenna configuration; and
allocating one of the antenna configurations from the antenna configuration set which is selected for the at least one user equipment;
wherein the communication system includes at least one remote radio head (RRH) electrically connected to the antennas.

7. The operating method of the communication system according to claim 6, further comprising:
changing the antenna configuration set which is selected to another one of the antenna configuration sets according to a moving status of the at least one user equipment.

8. The operating method of the communication system according to claim 7, wherein the moving status is a movement of the at least one user equipment in two different continuous time slots.

9. The operating method of the communication system according to claim 7, wherein the moving status is an angle difference between two beams formed by two of antenna configurations which are allocated for the at least one user equipment in two different continuous time slots.

10. The operating method of the communication system according to claim 7, wherein the moving status is an angle of arrival (AoA) of the at least one RRH corresponding to the at least one user equipment in two different continuous time slots.

11. The operating method of the communication system according to claim 6, wherein the step of allocating one of the antenna configurations from the antenna configuration set which is selected for the at least one user equipment is performed once every time slot.

12. The operating method of the communication system according to claim 6, wherein in each of the antenna configurations, the P of the antennas are adjacent.

13. The operating method of the communication system according to claim 6, wherein a plurality of angles of the antennas are not identical.

14. The operating method of the communication system according to claim 6, wherein in each of the antenna configuration sets, the antenna configurations are partially overlapped.

15. A communication system, comprising:
at least one user equipment;
at least one remote radio head (RRH), electrically connected to a plurality of antennas;
a measuring unit, used for controlling a measurement of a signal strength of the at least one user equipment;
a set determining unit, used for selecting one of a plurality of antenna configuration sets according to the signal strength for the at least one user equipment, each of the antenna configuration sets includes a plurality of antenna configurations, each of the antenna configurations is composed of P of a plurality of antennas, P is larger than or equal to 1, P is different in the antenna configuration sets; in the antenna configurations with different P, and the power level provided to all utilized antenna is fixed and always the same no matter the antenna configuration; and
an antenna selecting unit, used for allocating one of the antenna configurations from the antenna configuration set which is selected for the at least one user equipment.

16. The communication system according to claim 15, wherein the set determining unit is further used for changing the antenna configuration set which is set to another one of the antenna configuration sets according to a moving status of the at least one user equipment.

17. The communication system according to claim 16, wherein the moving status is a movement of the at least one user equipment in two different continuous time slots.

18. The communication system according to claim 16, wherein the moving status is an angle difference between two beams formed by two of antenna configurations which are allocated for the at least one user equipment in two different continuous time slots.

19. The communication system according to claim 16, wherein the moving status is an angle of arrival (AoA) of the at least one RRH corresponding to the at least one user equipment in two different continuous time slots.

20. The communication system according to claim 15, wherein the antenna selecting unit allocates one of the antenna configurations for the at least one user equipment once every time slot.

21. The communication system according to claim 15, wherein in each of the antenna configurations, the P of the antennas are adjacent.

22. The communication system according to claim 15, wherein a plurality of angles of the antennas are not identical.

23. The communication system according to claim 15, wherein in each of the antenna configuration sets, the antenna configurations are partially overlapped.

24. The communication system according to claim 15, wherein the measuring unit is further used for controlling a measurement of a plurality of performance values of the antenna configurations in each of the antenna configuration sets for the at least one user equipment, such that for the at least one user equipment, one of the antenna configurations is allocated.

25. The communication system according to claim 24, wherein the antenna selecting unit allocates one of the antenna configurations having a best performance value of the performance values for the at least one user equipment.

* * * * *